United States Patent [19]
Fox

[11] Patent Number: 5,346,052
[45] Date of Patent: Sep. 13, 1994

[54] FEED BUCKET FOR PROGRAMMED DELIVERY SYSTEM

[76] Inventor: Harvey Z. Fox, R.D. 3, Box 11A, Thorp, Wis. 54771

[21] Appl. No.: 51,675

[22] Filed: Apr. 23, 1993

[51] Int. Cl.⁵ .............................................. B65G 47/46
[52] U.S. Cl. .................................... 198/350; 198/704; 198/712
[58] Field of Search ..................... 198/350, 349.6, 703, 198/704, 706, 712

[56] References Cited

U.S. PATENT DOCUMENTS

| | | | |
|---|---|---|---|
| 837,811 | 12/1906 | Ebbeson . | |
| 1,056,523 | 3/1913 | Ferris . | |
| 1,113,738 | 10/1914 | Beane | 198/704 X |
| 1,799,534 | 4/1931 | Riblet . | |
| 2,336,129 | 12/1943 | Sargisson | 292/106 |
| 2,586,005 | 2/1952 | Colonna | 220/19 |
| 2,595,689 | 5/1952 | Mitchell | 198/704 |
| 2,615,424 | 10/1952 | Spickler | 119/51 |
| 3,296,954 | 1/1967 | Haub et al. | 198/704 X |
| 3,300,026 | 1/1967 | Lens et al. | 198/704 |
| 3,587,827 | 6/1971 | Schoen | 198/106 |
| 3,605,698 | 9/1971 | Thyberg | 119/52 |
| 3,695,234 | 10/1972 | Buschbom et al. | 119/52 B |
| 3,817,369 | 6/1974 | Bluthardt et al. | 198/704 X |
| 4,712,511 | 12/1987 | Zamzow et al. | 119/51 R |
| 4,892,185 | 1/1990 | Guardiola | 198/704 X |

*Primary Examiner*—D. Glenn Dayoan
*Attorney, Agent, or Firm*—Jacobson, Price, Holman & Stern

[57] ABSTRACT

An overhead track construction is provided including clam-type buckets supported from the track for guided movement therealong. The track extends past predetermined feeding stations into which material contained within the buckets is to be released and each of the buckets includes latch structure for releasably retaining the bucket halves thereof in closed positions. Each of the feeding locations includes track mounted latch release structure inoperative to release the latches of the buckets moving therepast in one direction but operative to engage and release the latches of the buckets moving therepast in the opposite direction.

18 Claims, 2 Drawing Sheets

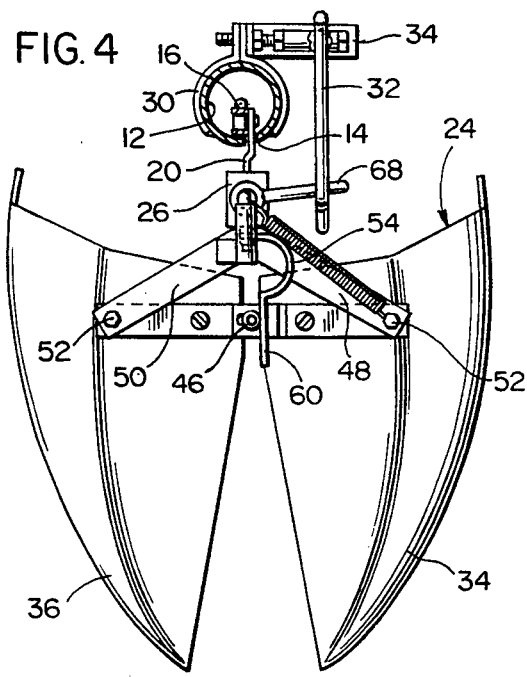
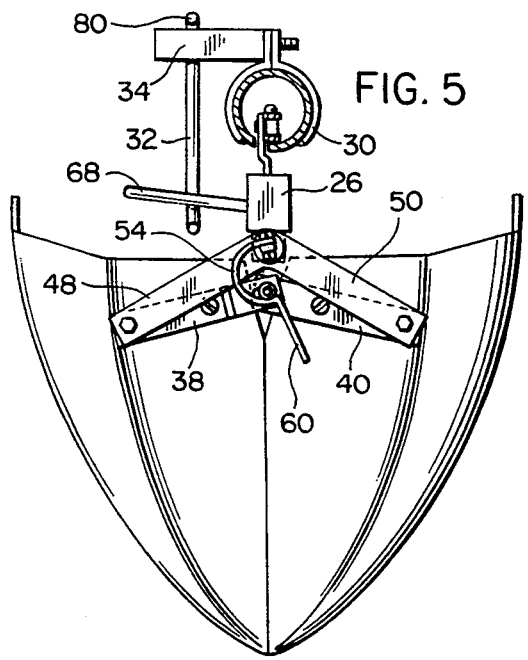
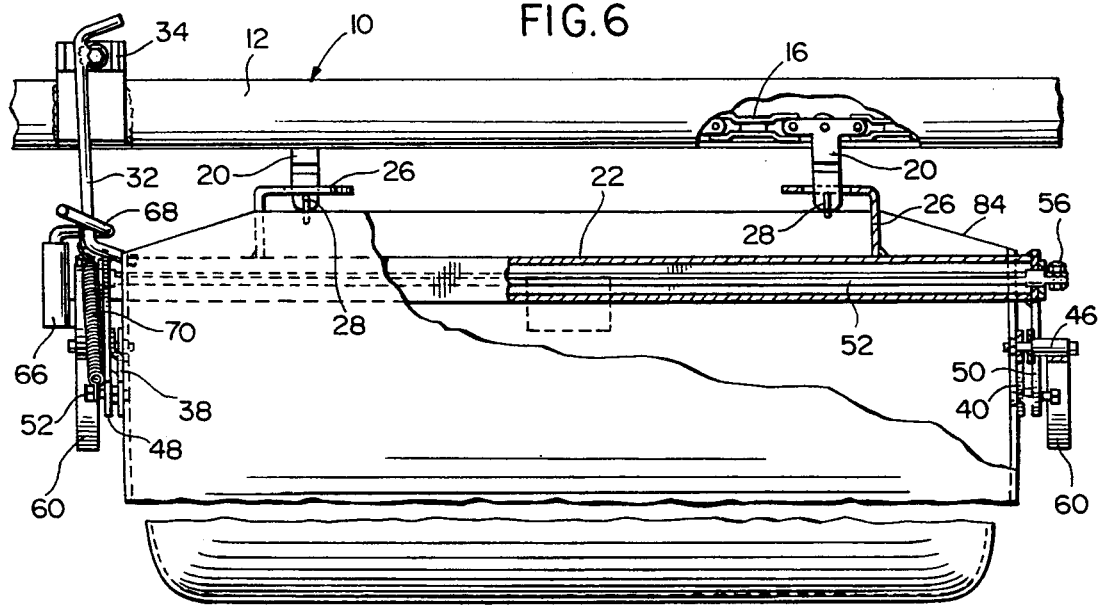
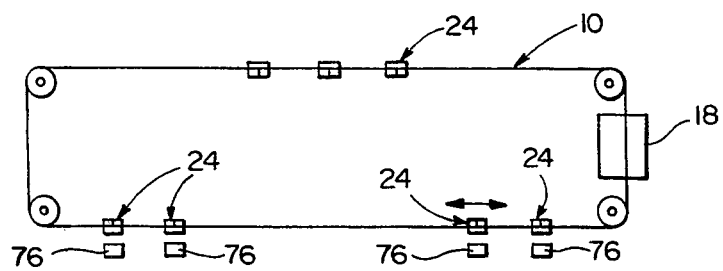

FEED BUCKET FOR PROGRAMMED DELIVERY SYSTEM

BACKGROUND OF THE INVENTION

Field of the Invention

This invention relates to a clam-type bucket for movement along an overhead track and designed to contain a programmed amount and type of feed and further operable, at a predetermined location on the track, to discharge the load therein after passing the aforementioned predetermined location in one direction and then moving reversely past the predetermined location in the opposite direction.

Description of Related Art

Various different forms of material handling and delivering structures incorporating tracks and containers moveable along the tracks heretofore have been provided as well as various latch mechanisms for releasably retaining containers in the closed positions. Furthermore, various track delivery systems incorporating containers moveable therealong heretofore have included structures for tipping or opening the containers at specific locations therealong.

Examples of these previously known devices are disclosed in U.S. Pat. Nos. 837,811, 1,056,523, 1,113,738, 1,799,5434, 2,336,129, 2,586,005, 2,615,424, 3,587,827, 3,605,698, 3,695,234 and 4,712,511. However, these previously known devices do not include the clam bucket construction of the instant invention in combination with the specific latch structure thereof for maintaining the clam bucket in the closed position or the track mounted latch trip operator which is inoperative to release the clam bucket latch when the clam bucket is moving in a forward direction, but which is operable to release the bucket latch when the bucket is moved in a reverse direction past a predetermined latch trip location on the track.

SUMMARY OF THE INVENTION

The feed delivery system of the instant invention includes a continuous track which passes through a feed mixing and proportioning loading station with a plurality of buckets simultaneously moveable along the track and including identification means thereon readable electronically at the loading station whereby each bucket that passes through the loading station may have a predetermined quantity and mix of feed dispensed thereinto while the bucket is in the closed position.

The track includes a predetermined number of latch trip mounted locations spaced therealong and each latch trip location includes structure which is inoperative to release the latch on any bucket when the bucket moves therepast in a forward direction, but which is operable to release the latch of a bucket when a bucket moves reversely therepast.

In this manner, specific animals in specific feeding locations disposed below the aforementioned latch trip locations may have the proper quantity and mix of food dispensed thereto.

The main object of this invention is to provide a feed delivery system for animals, such as cows, which will be operative to dispense a precise amount and mix of feed at each cow feeding location spaced along an overhead track assembly.

Another object of this invention is to provide a programmed feed delivery system in accordance with the preceding object and wherein the clam-type buckets thereof may be tightly closed against the leakage of feed therefrom immediately prior to moving into the bucket loading location.

Yet another object of this invention is to provide a programmed feed delivery system including clam-type buckets which require very little lateral or vertical clearance when being shifted between the open and closed positions thereof.

Another object of this invention is to provide a programmed feed delivery system wherein the locations of the latch trip operators thereof may be readily varied along the track.

A final object of this invention to be specifically enumerated herein is to provide a programmed feed delivery system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a left end elevational view of the assemblage illustrated in FIG. 1 with the bucket latch in the release position thereof and the bucket halves in their open positions;

FIG. 5 is a right end elevational view of the assemblage illustrated in FIG. 1 with the bucket latch in the operative position;

FIG. 6 is a fragmentary side elevational view of the assemblage illustrated in FIG. 1 with portions of the track and bucket being broken away and illustrated in vertical section;

FIG. 8 is a plan diagrammatic view of a typical feeding installation illustrating the manner in which a plurality of buckets may move past a fill station for receiving feed therein and thereafter move past feeding stations for dumping feed therefrom.

DESCRIPTION OF THE PREFERRED EMBODIMENT

Figure 1:
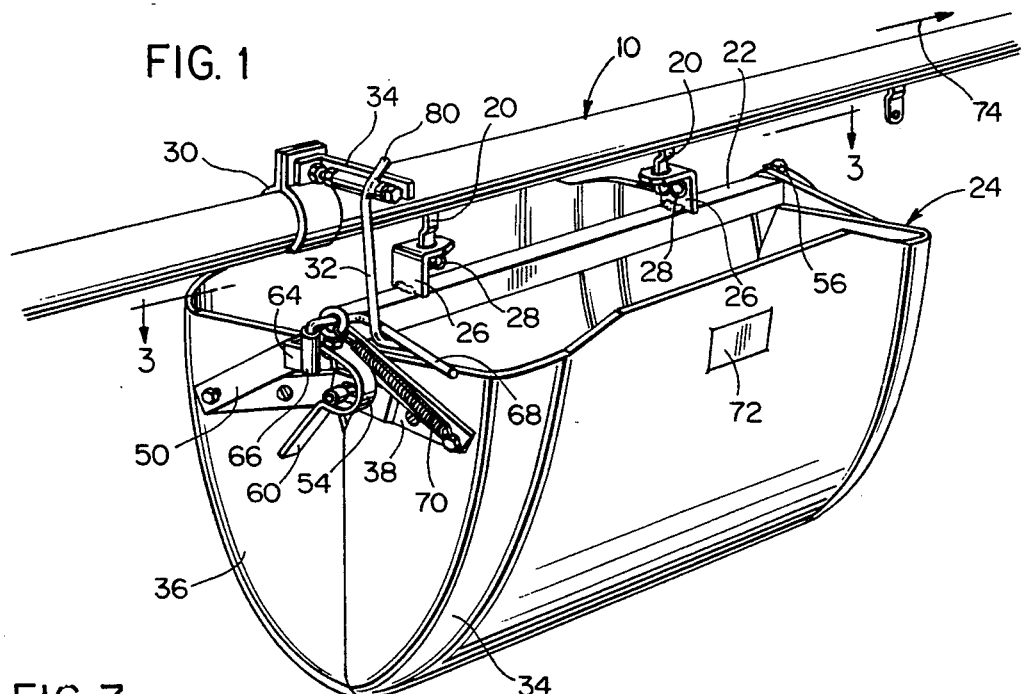
FIG. 1 is a fragmentary perspective view of a typical overhead track assembly area from which a one-way latch trip operator is supported and illustrating a clam-type feed bucket also supported therefrom during rearward movement of the bucket to the left immediately prior to release of the latch retaining the bucket halves in their tightly closed positions.

Referring now more specifically to FIGS. 1 and 8 of the drawings, there may be seen an overhead track assembly referred to in general by the reference numeral 10. The track assembly 10 includes a suitably supported tubular track 12, see FIG. 4, provided with a longitudinal slot 14 in its lower periphery extending the full length of the track 12. A chain 16 extends through the track 12 and may be driven in any convenient manner by reversible drive means (not shown) housed within or adjacent a bucket filling station 18.

Longitudinally spaced areas of the chain 16 include pairs of depending hangers 20 from which the opposite ends of a longitudinal central tubular bar 22 of a clam-type bucket assembly referred to in general by the reference numeral 24 is removably supported through the utilization of hanger brackets 26 and removable fasteners 28.

At predetermined locations along the track 10 a plurality of latch trip operator support brackets 30 are clamp supported, each bracket 30 pivotally supporting a latch trip operator arm 32 therefrom which may swing in a counterclockwise direction as viewed in FIG. 1 from a depending substantially vertical position to a substantially horizontal position with no resistance. However, each bracket 30 further includes an abutment 34 supported therefrom which limits swinging of the latch trip operator 32 in a clockwise direction as viewed in FIG. 1.

The clam-type bucket assemblies 24 each include a pair of substantially identical inner and outer clam bucket halves 34 and 36. The opposite ends of the halves 34 and 36 have pairs of mounting straps 38 and 40 supported therefrom having adjacent overlapped ends. The overlapped ends of the mounting straps 38 are provided with longitudinal slots 42 and the overlapped ends of the mounting straps 40 include lateral pins 44 supported therefrom slidably received in the corresponding slots and provided with rollers 46 journaled thereon outwardly of the slots 42. In addition, each pair of corresponding bucket ends includes support straps 48 and 50 which are downwardly and outwardly inclined and have their outer ends pivotally anchored relative to the corresponding ends of the mounting straps 38 and 40 through the utilization of pivot fasteners 52, the upper adjacent ends of the support strap 48 and 50 being secured together and to the corresponding ends of the tubular bar 22.

Figure 7:
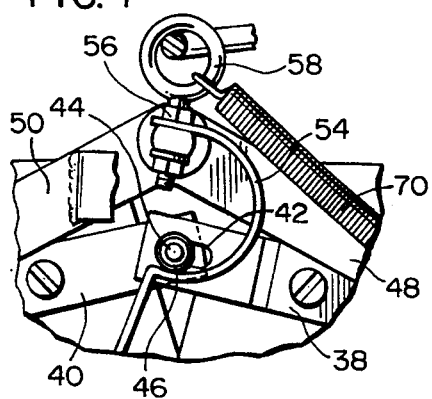
FIG. 7 is a fragmentary enlarged view of the left end of the bucket illustrated in FIG. 1 illustrating the connection between the latch trip arm and the pivoted latch of the bucket.

Journaled centrally through the tubular bar 22 is an operating rod 52 whose opposite ends project outwardly from the tubular bar 22 and have C-shaped latches 54 supported therefrom through the utilization of fasteners 56, the upper end of one of the fasteners 56 including an eye 58, see FIG. 7. The C-shaped latches are supported from the operating rod 52 at the free ends of the upper arms thereof and the free ends of the lower arms thereof include depending abutment flanges 60 for purpose to be hereinafter more fully set forth.

The left hand end of the bucket assembly 24 as illustrated in FIG. 1 supports a bracket 64 from the corresponding support strap 50 and a vertical journaled sleeve 66 is mounted from the bracket 64 and pivotally mounts one end of a multi-angle latch trip 68 therefrom whose base end is loosely received through the eye 58. In addition, an expansion spring 70 extends between and has its opposite ends anchored relative to the eye 58 and the pivot fastener 52 pivotally supporting the support strap 48 to the mounting strap 38, the latch trip being engageable by the latch trip operator 32. Finally, the bucket half 34 includes electronically readable identification means 72 thereon which may be read at the bucket filling station 18 to determine the quantity and mix of feed to be discharged into the bucket assembly 24.

In operation, the bucket assembly 24 moves along the track 10 in the direction of the arrow 74 in FIG. 1 past feeding stations to be occupied by particular cows to be fed, the cows either having electronic readable identification tags thereon or being trained or otherwise caused to enter respective feeding stations 76.

When the feeding is to begin, the chain 16 is driven along the track intermittently such that each bucket assembly 24 enters and stops within the station 18 in position to have feed placed thereinto. The identification means 72 of each bucket 24 is read at the bucket filling station 18 and the appropriate quantity and mix of feed is placed within the bucket.

After each of the bucket assemblies 24 has had the proper quantity and mix of feed placed therein, the chain 16 moves the bucket assemblies 24 further along the track 10 and as each bucket assembly 24 passes the respective feeding station 76, movement of the chain 16 is stopped and the chain is then moved in a reverse direction.

As a bucket assembly 24 first moves past the respective feeding station 76 in the direction of the arrow 74 in FIG. 1, the latch trip 68 engages the approach side of the depending latch trip operator 32 and swings the latter in a counterclockwise direction as viewed in FIG. 1 until the latch trip 68 moves beneath the latch trip operator 32 and the latter returns by gravity to the substantially vertical position thereof illustrated in FIG. 1. Then, as the chain 16 is reversed in direction, the latch trip 68 again engages the lower end of the latch trip operator and swings it in a clockwise direction until the upper extended end 80 of the latch trip operator 32 engages the abutment 34 to terminate its swinging movement. Thereafter, continued movement of the bucket assembly 24 to the left as viewed in FIG. 1 of the drawings causes the latch trip operator 32 to swing the latch trip 68 in a counterclockwise direction as viewed from above thereby rotating the latch 54 from the latched positions thereof illustrated in FIGS. 1, 2 and 7 to the unlatched position thereof illustrated in FIG. 4 whereby the roller 46 passes outwardly beyond the free end of the lower arm of the C-shaped latch 54 to enable the roller to drop downwardly along the flange 60 to the position thereof illustrated in FIG. 4, thereby enabling the weight of the feed within the bucket assembly 24 to swing the bucket halves 34 and 36 to the open positions thereof illustrated in FIG. 4 and thus discharge the feed from the bucket assembly 24 into the feed station 76.

Figure 2:
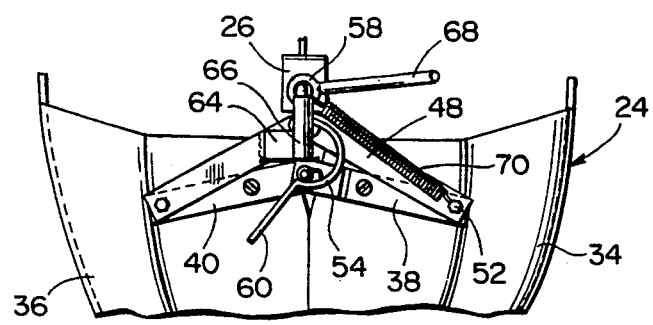
FIG. 2 is a fragmentary end elevational view of the left end of the bucket illustrated in FIG. 1.
Figure 3:
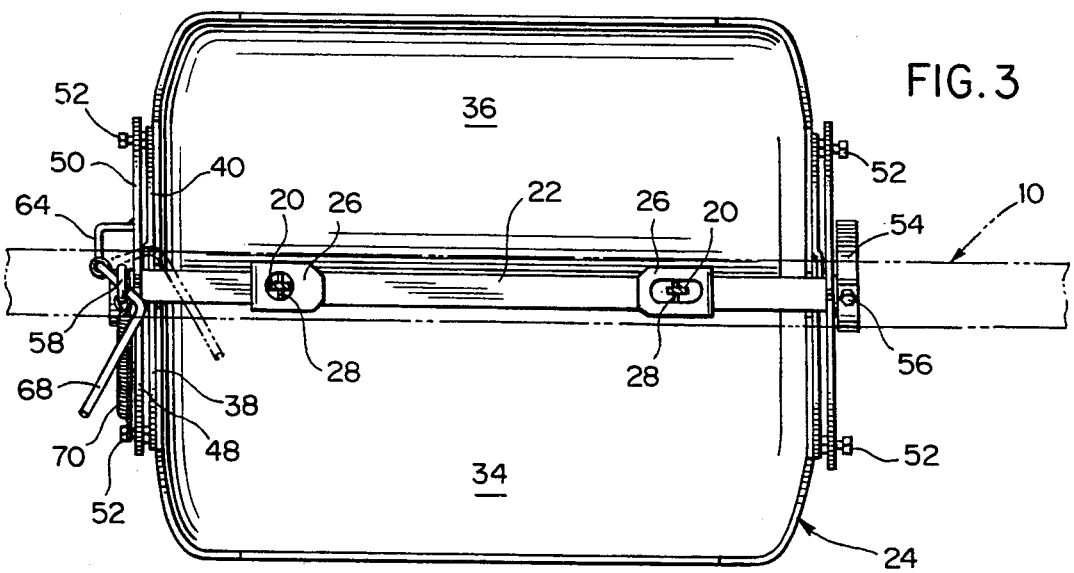
FIG. 3 is a top plan view of the bucket illustrated in FIG. 1 with an alternate position of the latch trip operator illustrated in phantom lines to release the latch on the bucket.

Inasmuch as the pivot connections between the support straps 48 and 50 and the bucket halves 34 and 36 and defined by the pivot fasteners 52 as shown in FIG. 4 are disposed outward of the lateral centers of gravity of the bucket halves 34 and 36, as soon as the feed within the bucket assembly 24 is discharged therefrom, the bucket halves 34 and 36 swing back toward the closed positions thereof sufficient to raise the roller 46 to a level slightly above the free end of the lower arms of the latches 54 whereupon the expansion spring 70, exerting a pull on the eye 58, will cause the latches 54 to again cam latch the bucket halves 34 and 36 tightly in their closed positions illustrated in FIGS. 1, 2 and 5.

If the bucket assemblies 24 are properly spaced along the track 10 according to the spacing between the feeding stations 76, all of the buckets 24 may be simultaneously opened as they simultaneously are reversed over the corresponding feeding stations 76. However, if such predetermined spacing is not provided, as each bucket assembly 24 having feed therein passes forwardly over and then reverses relative to the corresponding feeding station 76 that bucket 24 will have its load feed discharged therefrom.

With the instant invention proper quantity and mix of feed may be dispensed into each bucket assembly at the bucket filling station 18 by conventional known structure through reading of the identification means 72 on each of the bucket assemblies 74. Thereafter, proper discharging of the proper quantity and mix of feed at each feeding station 76 is readily carried out merely by reverse movement of the chain 16 at the proper time, all of which may be automatically controlled.

From a comparison of FIGS. 4 and 5 of the drawings it may be seen that the clam-type bucket assemblies 24 vary insignificantly in total height and width between open and closed positions. This enables the bucket assemblies 24 and the track 10 to be readily erected and utilized within a feed building which may have limited clearance because of supporting posts or beams. Further, if it is desired, immediately before entering the bucket filling station 18 the upper inclined edges 84 (see FIG. 6) of the bucket halves 34 and 36 may be engaged by yieldable abutments exerting downward pressure sufficient to even more tightly close the bucket halves 34 and 36 relative to each other. As this occurs, the expansion spring 70 will be operative to further rotate the latches 54 and tightly cam latch the bucket halves 34 and 36 into even more tightly closed positions.

The foregoing is considered as illustrative only of the principles of the invention. Further, since numerous modifications and changes readily will occur to those skilled in the art, it is not desired to limit the invention to the exact construction and operation shown and described and, accordingly, all suitable modifications and equivalents may be resorted to, falling within the scope of the invention.

What is claimed as new is as follows:

1. A clam bucket construction including a longitudinal central axis and a pair of opposite side bucket halves opening toward each other and including upper and lower portions, means pivotally joining adjacent upper portions together for relative inverse swinging of said bucket halves between open positions with their lower portions laterally spaced apart and closed positions with their lower portions swung toward each other, releasable latch means operatively associated with said bucket halves and operable to automatically move said bucket halves toward each other and retain said bucket halves in said closed positions when said bucket halves are shifted from said open positions to at least predetermined partially closed positions.

2. The clam bucket construction of claim 1 wherein said halves are relatively pivotally joined to each other for gravity swinging from said open positions toward said partially closed positions and are swingable from said closed positions to the open positions, when said latch means is released, by the load of fluent material in said bucket construction to be discharged therefrom.

3. The clam bucket construction of claim 1 wherein said releasable latch means comprises cam-type latch means including an elongated operator having opposite ends and mounted lengthwise above and along said bucket for oscillation about said longitudinal central axis between latching and unlatching positions, said opposite ends of said operator including generally C-shaped cam latch members supported therefrom and swingable in parallel planes disposed generally normal to said longitudinal axis, said adjacent upper portions of said halves at each end of said bucket including generally vertically shiftable abutment means operably mounted therefrom for up and down movement relative to said axis as said buckets are closed and opened, respectively, said cam members, when swung in one direction, being operable to engage and upwardly cam said abutment means.

4. The clam bucket construction of claim 3 including means operably connected between at least one of said halves and said operator yielding biasing angular displacement thereof in a direction to swing said cam latch members in said one direction.

5. The clam bucket construction of claim 4 wherein said halves are relatively pivotally joined to each other for gravity swinging from said closed positions toward said open positions when said latch means is released, by the load of fluent material in said bucket construction to be discharged therefrom.

6. The clam bucket construction of claim 1 wherein said releasable latch means includes an elongated operator having opposite ends and mounted lengthwise above and along said bucket for oscillation about said longitudinal central axis between latching and unlatching positions, said opposite ends of said operator including generally C-shaped cam latch members supported therefrom and swingable in parallel planes disposed generally normal to said longitudinal axis, said adjacent upper portions of said halves at each end of said bucket including generally vertically shiftable abutment means operably mounted therefrom for up and down movement relative to said axis as said buckets are closed and opened respectively, said cam members, when swung in one direction, being operable to engage and upwardly cam said abutment means, and an overhead track, said bucket construction having its opposite end portions supported from said track for guided movement therealong.

7. The clam bucket construction and track combination of claim 6 wherein said track includes predetermined locations therealong, each of said predetermined locations including a one-way latch trip operator supported therefrom, said latch means including an oscillatable latch trip operatively connected to said operator for shifting between first and second positions as said operator is shifted between its latching and unlatching positions respectively, said one-way latch trip operator being inoperable to shift said latch trip to said second position upon movement of said bucket construction in one direction along said track past one of said locations and operative to shift said latch trip to said second position upon movement of said bucket construction in the opposite direction along said track past said one location.

8. The combination of claim 7 wherein said latch trip operator is shiftably supported from said track for movement between active and inactive positions, and yielding biased toward said active position, said latch trip being operative to shift said latch trip operator to said active position upon movement of said bucket construction in said one direction along said track past said one predetermined location.

9. The combination of claim 8 wherein said latch trip operator is gravity biased to said active position.

10. A bucket construction including a pair of opposite side bucket halves opened toward each other along an upstanding plane and having upper and lower portions, means relatively pivotally joining adjacent upper portions of said bucket halves for relative inverse swinging of said bucket halves between open positions with their lower portions laterally spaced apart and closed positions with their lower portions swung toward each other, said bucket halves being gravity biased toward said closed positions, releasable latch means operatively associated with said bucket halves and operable to automatically move said bucket halves further toward and retain said bucket halves in said closed positions upon movement of said bucket halves from said open position to predetermined partially closed positions, said latch means being inoperative to move said bucket halves toward said closed positions when said bucket halves are disposed between said open positions and said predetermined partially closed positions.

11. The bucket construction of claim 10 wherein said releasable latch means includes an elongated operator having opposite ends and mounted lengthwise above and along said bucket for oscillation about said longitudinal central axis between latching and unlatching positions, said opposite ends of said operator including generally C-shaped cam latch members supported therefrom and swingable in parallel planes disposed generally normal to said longitudinal axis, said adjacent upper portions of said halves at each end of said bucket including generally vertically shiftable abutment means operably mounted therefrom for up and down movement relative to said axis as said buckets are closed and opened respectively, said cam members, when swung in one direction, being operable to engage and upwardly cam said abutment means.

12. The bucket construction of claim 11 including an overhead track, said bucket being elongated and having its opposite end portions supported from said track for guided movement therealong.

13. The bucket construction and track combination of claim 12 wherein said track includes predetermined locations therealong, each of said predetermined locations including a one-way latch trip operator supported therefrom, said latch means including an oscillatable latch trip operatively connected to said operator for shifting between first and second positions as said operator is shifted between its latching and unlatching positions respectively, said one-way latch trip operator being inoperable to shift said latch trip to said second position upon movement of said bucket construction in one direction along said track past one of said locations and operative to shift said latch trip to said second position upon movement of said bucket construction in the opposite direction along said track past said one location.

14. The combination of claim 13 wherein said latch trip operator is shiftably supported from said track for movement between active and inactive positions, and yielding biased toward said active position, said latch trip being operative to shift said latch trip operator to said active position upon movement of said bucket construction in said one direction along said track past said one predetermined location.

15. The combination of claim 14 wherein said latch trip operator is gravity biased to said active position.

16. The bucket construction of claim 10 wherein said bucket construction includes electronically readable identification means thereon.

17. The method of dispensing, at a remote location, fluent material from a clam-type bucket of the type including releasable latch means releasably retaining the halves of said bucket closed against opening thereof by the weight of the fluent material in said bucket; said method including providing a support track extending toward and past said location, providing reversible drive means for selectively intermittently driving said bucket along said track, providing a latch operator on said track at said remote location inoperative to release said latch means upon movement of said bucket therepast in one direction along said track and operative to engage and release said latch means upon movement of said bucket therepast in the opposite direction, initially driving said bucket in said one direction along said track past said remote location, terminating movement of said bucket along said track, and thereafter driving said bucket along said track in said opposite direction past said location.

18. The method of claim 17 wherein said track comprises a closed loop-type track and includes a bucket fill station thereon spaced from said location, said step of initially driving said bucket in said one direction including driving said bucket from said fill station to and past said location, and, subsequent to the step of driving said bucket in said opposite direction past said location, terminating movement of said bucket and thereafter moving said bucket in said one direction past said location and back to said fill station.

* * * * *